US007996225B2

(12) United States Patent
Schmid et al.

(10) Patent No.: US 7,996,225 B2
(45) Date of Patent: Aug. 9, 2011

(54) UTILIZING SPEECH GRAMMAR RULES WRITTEN IN A MARKUP LANGUAGE

(75) Inventors: Philipp H. Schmid, Seattle, WA (US); Ralph Lipe, Clyde Hill, WA (US); Erik C. Ellerman, Palo Alto, CA (US); Robert L. Chambers, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

(21) Appl. No.: 12/124,792

(22) Filed: May 21, 2008

(65) Prior Publication Data

US 2008/0243483 A1 Oct. 2, 2008

Related U.S. Application Data

(62) Division of application No. 09/759,474, filed on Jan. 12, 2001, now Pat. No. 7,389,234.

(60) Provisional application No. 60/219,861, filed on Jul. 20, 2000.

(51) Int. Cl.
*G10L 13/08* (2006.01)

(52) U.S. Cl. .................................................... 704/260

(58) Field of Classification Search .................. 704/260, 704/273, 4

See application file for complete search history.

(56) References Cited

U.S. PATENT DOCUMENTS

| | | | | |
|---|---|---|---|---|
| 5,225,981 | A | 7/1993 | Yokogawa | 704/2 |
| 5,418,717 | A | 5/1995 | Su et al. | 704/9 |
| 5,610,812 | A | 3/1997 | Schabes et al. | 704/9 |
| 5,642,519 | A | 6/1997 | Martin | 704/9 |
| 5,669,007 | A | 9/1997 | Tateishi | 715/517 |
| 5,748,841 | A | 5/1998 | Morin et al. | 704/257 |
| 5,805,832 | A | 9/1998 | Brown et al. | 711/1 |
| 5,883,986 | A | 3/1999 | Kopec et al. | 382/310 |
| 5,960,447 | A | 9/1999 | Holt et al. | 715/500 |
| 6,038,573 | A * | 3/2000 | Parks | 715/202 |
| 6,064,965 | A | 5/2000 | Hanson | 704/275 |
| 6,085,190 | A | 7/2000 | Sakata | 707/6 |
| 6,374,226 | B1 | 4/2002 | Hunt et al. | 704/275 |
| 6,424,945 | B1 | 7/2002 | Sorsa | 704/270.1 |
| 6,470,317 | B1 * | 10/2002 | Ladd et al. | 704/275 |

(Continued)

FOREIGN PATENT DOCUMENTS

WO WO 94/15294 7/1994

OTHER PUBLICATIONS

Brown, Michael; Wilpon, Jay. "A Grammar Compiler for Connected Speech Recognition." *IEEE Transactions on Signal Processing*. vol. 39, No. 1. Jan. 1991. 17-28.

Frost, R. A. "A Natural-Language Speech Interface Constructed Entirely As a Set of Executable Specifications." *Proceedings Sixteenth National Conference on Artificial Intelligence*. Jul. 1999. 908-909.

(Continued)

*Primary Examiner* — Michael N Opsasnick
(74) *Attorney, Agent, or Firm* — Merchant & Gould

(57) ABSTRACT

The present invention provides a method and apparatus that utilize a context-free grammar written in a markup language format. The markup language format provides a hierarchical format in which grammar structures are delimited within and defined by a set of tags. The markup language format also provides grammar switch tags that indicate a transitions from the context-free grammar to a dictation grammar or a text buffer grammar. In addition, the markup language format provides for the designation of code to be executed when particular grammar structures are recognized from a speech signal.

20 Claims, 14 Drawing Sheets

U.S. PATENT DOCUMENTS

| | | | | |
|---|---|---|---|---|
| 6,501,832 | B1 | 12/2002 | Saylor et al. | 379/88.04 |
| 6,587,822 | B2 * | 7/2003 | Brown et al. | 704/275 |
| 6,707,889 | B1 | 3/2004 | Saylor et al. | 379/88.04 |
| 6,708,153 | B2 | 3/2004 | Brittan et al. | 704/260 |
| 6,725,199 | B2 | 4/2004 | Brittan et al. | 704/258 |
| 7,389,234 | B2 | 6/2008 | Schmid et al. | |

OTHER PUBLICATIONS

Java™ Speech Grammar Format Specification. 1997. <http://java.sum.com/products/java-media/speech/forDevelopers/JSGF/JSGF.html>.

Murata, M. "Data Model for Document Transformation and Assembly." *Principle of Digital Document Processing. 4th International Conference*. Mar. 1998. 140-152.

Office Actions, Responses, and Appeal Briefs from U.S. Appl. No. 09/759,474, filed Jan. 12, 2001.

Rostek, L. "Marking Up in TATOE and Exporting to SGML: Rule Development for Identifying NITF Categories." *Computers and the Humanities*. vol. 31, No. 4. 1997-1998. 311-326.

Taylor et al. "SSML: A Speech Synthesis Mark-up Language." *Speech Communication*. vol. 21, Nos. 1-2. Feb. 1997. 123-133.

Tayeb-Bay et al. "Grammatical Formalism for Document Understanding System: From Documents Towards HTML Text." *Advances in Document Image Analysis, BSDIA* '97. Nov. 1997. 165-175.

VoiceXML, Voice Extensible Markup Language VoiceXML. Version 0.9. Aug. 17, 1999.

VoiceXML Forum, Voice Extensible Markup Language VoiceXML. Version 1.00. Mar. 7, 2000.

* cited by examiner

```
                                                   500
<GRAMMAR LANGID="1033">
    <DEFINE>
502           <ID NAME="FROM" VAL="1"/>
              <ID NAME="TO" VAL="2"/>
              <ID NAME="SUIT" VAL="3"/>                    508
506           <ID NAME="COLOR" VAL="4"/>
              <ID NAME="RANK" VAL="5"/>
              <ID NAME="ColorRed" VAL="11101"/>
              <ID NAME="ColorBlack" VAL="10011"/>
    </DEFINE>
    <RULE NAME="newgame" TOPLEVEL="ACTIVE">
          <P>new +game</P><O>-please</O>
    </RULE>          560                     562                     510
    <RULE NAME="playcard" TOPLEVEL="ACTIVE" EXPORT="1">
          <O>please</O> <P>play the</P> <O>...</O>
          <RULEREF NAME="card"/>
          <O>please</O>
    </RULE>           512                                  522
    <RULE NAME="movecard" TOPLEVEL="ACTIVE">
          <O>please</O>    534     538
          <P>                               540
530           <L>
542                <P>move</P>
                   <P>put</P>                544
536           </L>                                         520
546           <P>the</P>      548
          </P>
532       <RULEREF PROPNAME="from" PROPID="FROM" NAME="card"/>
          <O>
              <L>
                   <P>on</P>
                   <P>to</P>
              </L>
              <P>the</P>
570           <RULEREF PROPNAME="to" PROPID="TO" NAME="card"/>
          </O>
          <O>please</O>      572
    </RULE>
```

```
<RULE NAME="card">                                        600
    <L>
        <P>
            <LN PROPNAME="color" PROPID="COLOR">
                <PN VAL="ColorRed">red</PN>
                <PN VAL="ColorBlack">black</PN>
            </LN>
            <RULEREF NAME="rank"/>
        </P>
        <P>
            <RULEREF NAME="rank"/>
620         <O>
                <P>of</P>                                 626
624             <LN PROPNAME="suit" PROPID="SUIT">
628                 <PN VAL="0">clubs</PN>
                    <PN VAL="1">hearts</PN>
                    <PN VAL="2">diamonds</PN>
622                 <PN VAL="3">spades</PN>
                </LN>                                     630
            </O>
        </P>
        <LN PROPNAME="suit" PROPID="SUIT">
            <PN VAL="0">club</PN>
            <PN VAL="1">heart</PN>
            <PN VAL="2">diamond</PN>
            <PN VAL="3">spade</PN>
    </LN>
    </L>
</RULE>
```

```
<RULE NAME="rank">
    <LN PROPNAME="rank" PROPID="RANK">        710
        <PN VAL="1">ace</PN>
        <PN VAL="2">two</PN>        714
        <PN VAL="3">three</PN>
        <PN VAL="4">four</PN>
        <PN VAL="5">five</PN>
        <PN VAL="6">six</PN>
        <PN VAL="7">seven</PN>
        <PN VAL="8">eight</PN>
        <PN VAL="9">nine</PN>
        <PN VAL="10">ten</PN>
        <PN VAL="11">jack</PN>
        <PN VAL="12">queen</PN>
        <PN VAL="13">king</PN>
        <PN VAL="12">lady</PN>
        <PN VAL="13">emperor</PN>
    </LN>
</RULE>        712
</GRAMMAR>
        700
```

FIG. 7

```
<GRAMMAR LANGID="1033">
        <DEFINE>
                <ID NAME="OVER" VAL="1"/>
                <ID NAME="ONES" VAL="9898"/>
        </DEFINE>
                                                                      1300
        <RULE NAME="moreorless" TOPLEVEL="ACTIVE">
1302            <LN PROPNAME="over" PROPID="OVER" >
1306                    <PN VAL="1">more</PN>
                        <PN VAL="0">less</PN>
1308            </LN>                                                 1314
1304            <P>than</P>      1312
1310            <RULEREF PROPNAME="givennumber" NAME="number"/>
        </RULE>

1320    <RULE NAME="number" INTERPRETER=1>
1324            <L>                                                   1328
                        <RULEREF NAME="numberinhundreds"/>
                        <RULEREF NAME="numberintens"/>                1330
                        <RULEREF NAME="numberinones"/>                1332
1326            </L>
1322    </RULE>

        <RULE NAME="numberinones">
1340            <LN PROPNAME="ones" PROPID="ONES" >                   1344
                        <PN VAL="0">zero</PN>
                        <PN VAL="1">one</PN>
                        <PN VAL="2">two</PN>
1348                    <PN VAL="3">three</PN>
                        <PN VAL="4">four</PN>
                        <PN VAL="5">five</PN>
                        <PN VAL="6">six</PN>
                        <PN VAL="7">seven</PN>
                        <PN VAL="8">eight</PN>
1346                    <PN VAL="9">nine</PN>
                </LN>
        </RULE>
1342
```

FIG. 13

```
<RULE NAME="numberintens">
  <L>
    <P>
      <LN PROPNAME="tens">
        <PN VAL="2">twenty</PN>
        <PN VAL="3">thirty</PN>
        <PN VAL="4">fourty</PN>
        <PN VAL="5">fifty</PN>
        <PN VAL="6">sixty</PN>
        <PN VAL="7">seventy</PN>
        <PN VAL="8">eighty</PN>
        <PN VAL="9">ninety</PN>
      </LN>
      <O>
        <RULEREF NAME="numberinones"/>
      </O>
    </P>
    <LN PROPNAME="tensandones">
      <PN VAL="10">ten</PN>
      <PN VAL="11">eleven</PN>
      <PN VAL="12">twelve</PN>
      <PN VAL="13">thirteen</PN>
      <PN VAL="14">fourteen</PN>
      <PN VAL="15">fifteen</PN>
      <PN VAL="16">sixteen</PN>
      <PN VAL="17">seventeen</PN>
      <PN VAL="18">eighteen</PN>
      <PN VAL="19">nineteen</PN>
    </LN>
  </L>
</RULE>

<RULE NAME="numberinhundreds">
  <RULEREF NAME="hundredmark" PROPNAME="hundreds" />
  <P>hundred</P>
  <O>
    <RULEREF NAME="numberintens" />
  </O>
  <O>
    <RULEREF NAME="numberinones" />
  </O>
</RULE>
```

Reference numerals: 1400, 1402, 1404, 1406, 1408, 1410, 1412, 1414, 1416, 1418, 1420, 1422, 1424, 1426, 1428, 1450, 1452, 1454, 1456, 1460, 1462, 1464, 1466, 1468, 1470

```
<RULE NAME="hundredmark" INTERPRETER=1>
        <RULEREF NAME="numberinones" />
</RULE>
</GRAMMAR>
```

1504

1502

UTILIZING SPEECH GRAMMAR RULES WRITTEN IN A MARKUP LANGUAGE

REFERENCE TO RELATED APPLICATION

This application is a Divisional of and claims priority from U.S. patent application Ser. No. 09/759,474 filed Jan. 12, 2001, now U.S. Pat. No. 7,389,234 issued Jun. 17, 2008, which claims priority from a U.S. Provisional Application having Ser. No. 60/219,861, filed on Jul. 20, 2000 and entitled "MICROSOFT SPEECH SDK (SAPI 5.0)".

BACKGROUND OF THE INVENTION

The present invention relates to grammars used in speech recognition. In particular, the invention relates to context-free grammars.

In speech recognition systems, a computer system attempts to identify a sequence of words from a speech signal. One way to improve the accuracy of the recognition is to limit the recognition to a set of selected phrases. This is typically done by limiting valid recognition hypothesis to phrases that are found in a context-free grammar (CFG).

In prior art speech recognition systems, context-free grammars were specified using the Bakus-Nauer Form (BNF) which identifies valid phrases using a two-part format. The left part of the Bakus-Nauer Form contains a non-terminal reference to the phrase, and the right part of the Bakus-Nauer Form contains a sequence of terminal and non-terminal nodes that represent the phrase. In this context, a terminal node is a generally a word and a non-terminal node is a reference to an additional phrase or word.

Although the Bakus-Nauer Form does allow indirect reference to a phrase, thereby eliminating the need to repeat phrases in the context-free grammar, it is still somewhat limited. In particular, the Bakus-Nauer Form does not provide an easy means for providing alternative words, optional words, transitional probabilities, semantic properties, or executable code in a phrase.

In the past, some attempts have been made to modify the Bakus-Nauer Form to allow for some of these items. In particular, some prior art systems have added diacritics to the Bakus-Nauer Form to indicate that some words are alternative, others are optional, or the weight that is to be attributed to the words. The use of diacritics, however, is less than ideal since their meaning is not readily apparent and their scope is difficult to determine. In addition, diacritics do not allow for the inclusion of code or semantic properties in the context-free grammar.

Because of these factors, context-free grammars are difficult to author and have limited abilities. As such, a speech recognition system is needed that can take advantage of a different context-free grammar format.

SUMMARY OF THE INVENTION

The present invention provides a method and apparatus that utilize a context-free grammar written in a markup language format. The markup language format provides a hierarchical format in which grammar structures are delimited within and defined by a set of tags. The markup language format also provides grammar switch tags that indicate a transitions from the context-free grammar to a dictation grammar or a text buffer grammar. In addition, the markup language format provides for the designation of code to be executed when particular grammar structures are recognized from a speech signal.

BRIEF DESCRIPTION OF THE DRAWINGS

FIGS. 5, 6, and 7 together provide a description of a single grammar written in a markup language format of the present invention.

FIGS. 13, 14, and 15 show the grammar rules of FIGS. 8-12 written in a markup language of the present invention.

FIG. 16 is a semantic tree structure showing the first expansion of a semantic tree based on the recognition of the "moreorless" rule.

DETAILED DESCRIPTION OF ILLUSTRATIVE EMBODIMENTS

Figure 1:
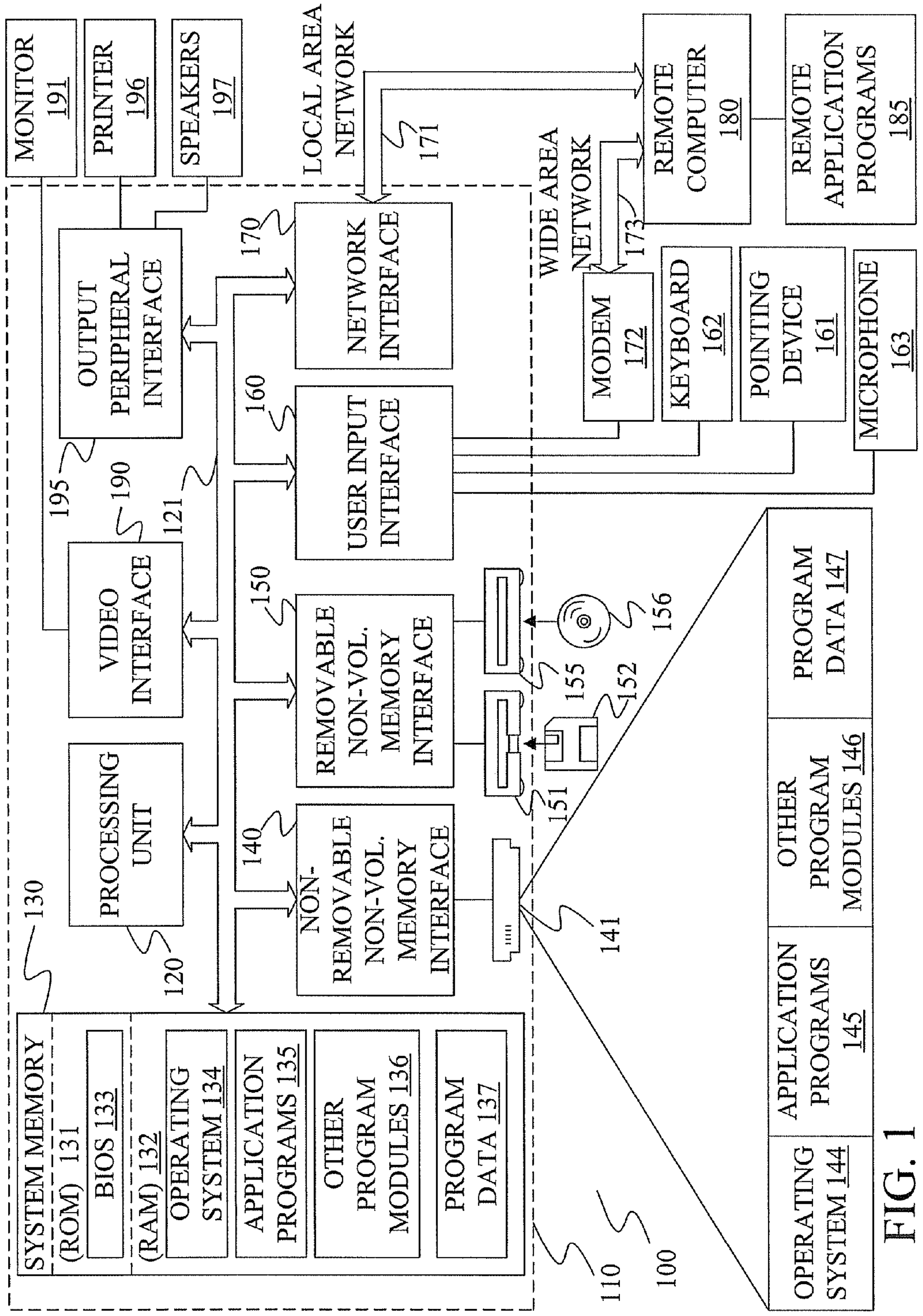
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
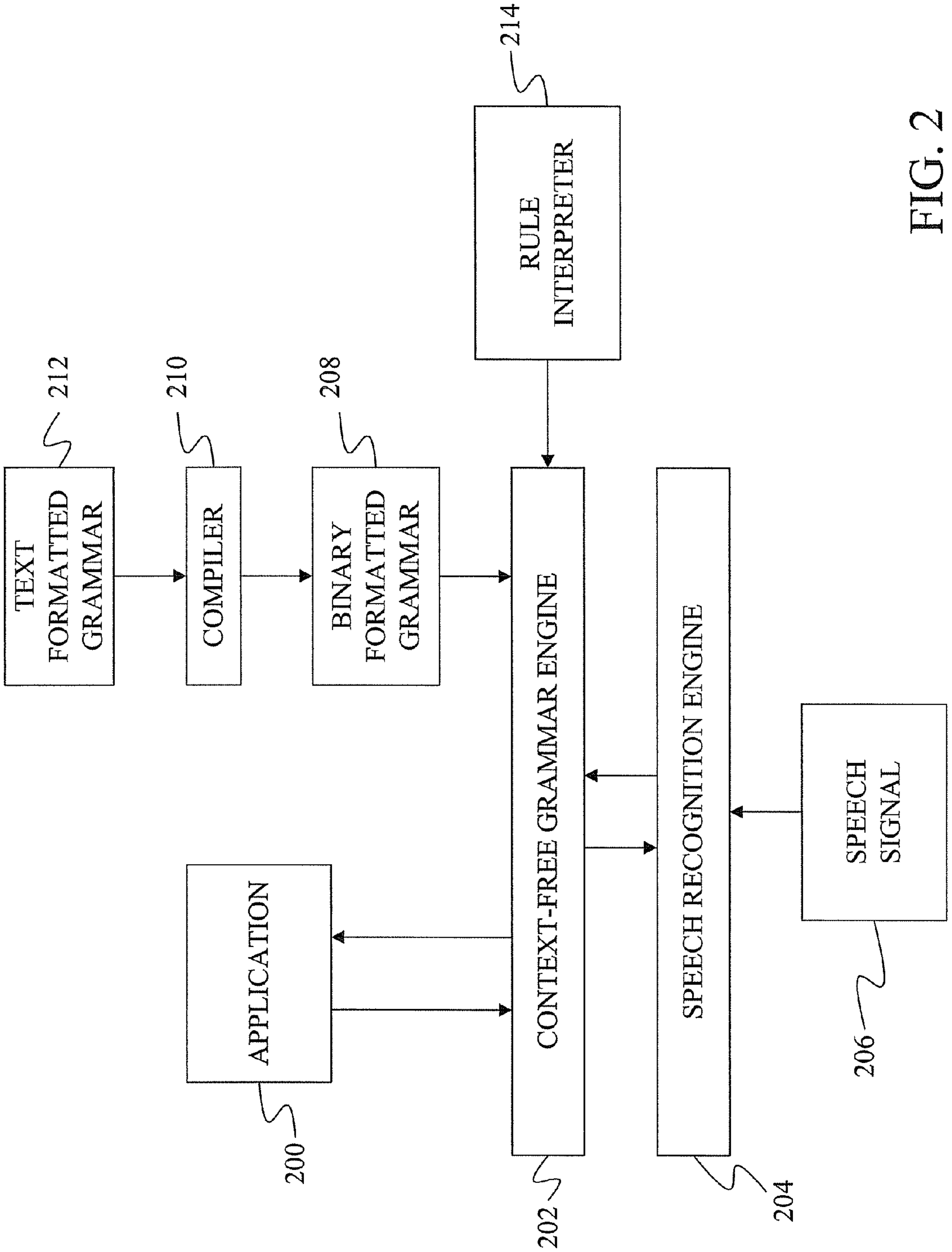
FIG. 2 is a block diagram of a speech recognition system under the present invention.

FIG. 2 provides a block diagram of a speech recognition system under one embodiment of the present invention. In FIG. 2, an application 200 utilizes a context-free grammar engine 202 and a speech recognition engine 204 to identify words and/or semantic meaning from a speech signal 206 that is provided to speech recognition engine 204. During speech recognition, speech recognition engine 204 determines the likelihood that speech signal 206 represents one or more possible phrases. To do this, speech recognition engine 204 utilizes a binary grammar 208 that is provided to it by context-free grammar engine 202.

Binary grammar 208 defines a limited set of binary-formatted grammar structures that that can be recognized from an input speech signal. Binary grammar 208 is produced by compiler 210 based on a text-formatted grammar 212. Under the present invention, the text-formatted grammar 212 is formatted using a markup language. Example tags for one embodiment of this markup language are discussed further below.

During recognition, speech recognition engine 204 is limited to recognizing grammar structures in binary formatted grammar 208. When it recognizes a grammar structure from a speech signal or recognizes a grammar structure as one hypothesis for a speech signal, speech recognition engine 204 identifies the grammar structure to context-free grammar engine 202.

Based on the information received from speech recognition engine 204, context-free grammar engine 202 generates a parse tree that indicates the words that have been recognized and a semantic parse tree that indicates the semantic meaning associated with the grammar structure. As discussed further below, while generating the semantic parse tree, context-free grammar engine 202 may cause a section of code, identified as a rule interpreter 214, to execute if one of the identified grammar structures returned by speech recognition 204 has a rule interpreter associated with it.

The semantic tree structure and the word tree structure are then returned by context-free grammar engine 202 to application 200.

In one embodiment, compiler 210 and context-free grammar engine 202 together form a speech recognition interface. This interface acts as a front end between an application that has an associated text-formatted grammar or binary-formatted grammar and a speech recognition engine.

Figure 3:
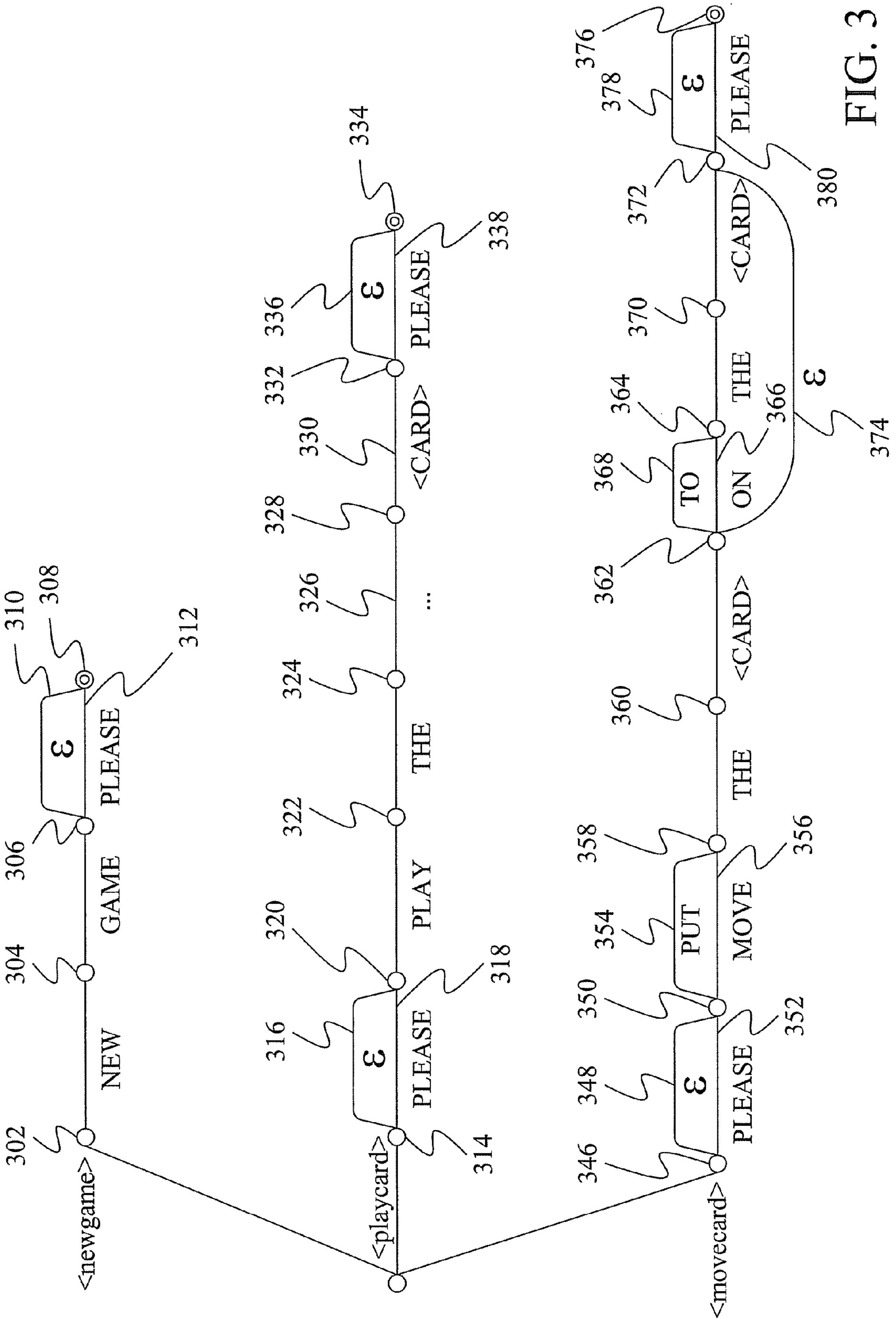
FIG. 3 is a state diagram showing the grammar structure for a set of grammar rules.

In one embodiment, binary grammar 208 is the binary version of a state diagram formed by compiler 210 from text-formatted grammar 212. FIG. 2 provides an example of a state diagram showing three top-level grammar structures derived from text-formatted grammar 212. In FIG. 3, the three grammar structures are <newgame>, <playcard>, and <movecard>, which begin at nodes 302, 314, and 346, respectively.

The newgame grammar structure has a transition from starting node 302 to node 304 that is associated with the word "new". From state 304 to state 306, this structure has a second word transition associated with the word "game". After state 306, there are two parallel transitions 310 and 312 to a final state 308. Transition 310 is an epsilon transition indicating that word transition 312, which is associated with the word "please", is optional.

During speech recognition, speech recognition engine 204 traverses the state diagram to determine whether speech signal 206 corresponds to any of the grammar structures. For example, speech recognition engine 204 will identify the <newgame> structure as corresponding to speech signal 206 if the word "new" is found at the beginning of the speech signal followed by the word "game". Note that since the word please is optional in the <newgame> structure, speech recognition 204 will identify the newgame structure even if the word "please" is not found in the speech signal.

The <playcard> grammar structure, which starts at node 314, is more complex than the <newgame> structure. From starting node 314, the <playcard> structure has an epsilon transition 316 and a word transition 318 that both end at state 320. Epsilon transition 316 indicates that the "please" associated with word transition 318 is optional. From state 320, there are two consecutive word transitions leading respectively to state 322 and state 324. These word transitions are associated with the words "play" and "the", respectively.

From state 324 to state 328, the <playcard> structure has a wildcard transition 326. During this transition, speech recognition engine 204 will ignore any input provided by the user after the word "the" and before words associated with a <card> grammar structure which is found at transition 330 from state 328 to state 332. Thus, no matter what the user says during transition 326, speech recognition engine 204 can still identify the <playcard> structure as being recognized for the speech signal.

Transition 330 of the <playcard> structure is a grammar structure transition. When speech recognition 204 encounters this transition, it substitutes the entire state diagram of the referenced grammar structure in place of the grammar structure transition. For example, speech recognition engine 204 would replace transition 330 with the state diagram of FIG. 4, which represents the <card> grammar structure. It would then determine if speech signal 206 could be represented by part of the complete <playcard> grammar structure including the portion of that structure provided by the <card> grammar structure.

From state 332 to end state 334 of the <playcard> structure, there is an epsilon transition 336 and a word transition associated with the word "please". Epsilon transition 336 indicates that the word "please" is optional in the <playcard> structure.

The <movecard> structure associate with start node 346 begins with an epsilon transition 348 to state 350. Epsilon transition 348 is in parallel with a word transition 352 associated with the word "please". As such, the word "please" is optional.

From state 350 to state 358, the <movecard> structure provides two parallel transitions 354 and 356 associated with the words "put" and "move", respectively. Thus, if the user says either "put" or "move", the speech recognition engine 204 will identify these portions of the speech signal with the <movecard> structure.

From state 358 to state 360, there is a single word transition associated with the word "the". From state 360 to state 362, the <movecard> structure provides a grammar structure transition associated with the <card> grammar structure.

From state 362 to state 364, there are two parallel word transitions 366 and 368, associated with the words "on" and "to", respectively. A word transition for the word "the" extends from state 364 to state 370, which is followed by a grammar structure transition to state 372 for the <card> grammar structure.

An epsilon transition extends from state 362 to state 372. This epsilon transition indicates that the transitions between states 362, 364, 370, and 372, are all optional. As such, the words associated with these transitions do not need to be present in the speech signal in order for speech recognition engine 204 to identify the <movecard> structure from the speech signal.

From state 372 to end state 376 there is epsilon transition 378 in parallel with a word transition 380. Epsilon transition 378 indicates that the word "please" associated with transition 380 is optional.

As can be seen from the description of FIG. 3 above, the state diagram used by the speech recognition engine is quite complicated. Because of this, it is often difficult to use the Bakus-Nauer Format to specify a context-free grammar. However, under the present invention, a markup language format is provided that greatly simplifies the task of specifying a context-free grammar.

Below, one embodiment of a markup language that can be used to represent a context-free grammar under the present invention is described. In particular, a set of markup tags is described that can be used to specify a context-free grammar. Those skilled in the art will recognize that the present invention is not limited to the particular tags described below, and that other markup language tags can be used in place of or in conjunction with the tags described below.

Figure 4:
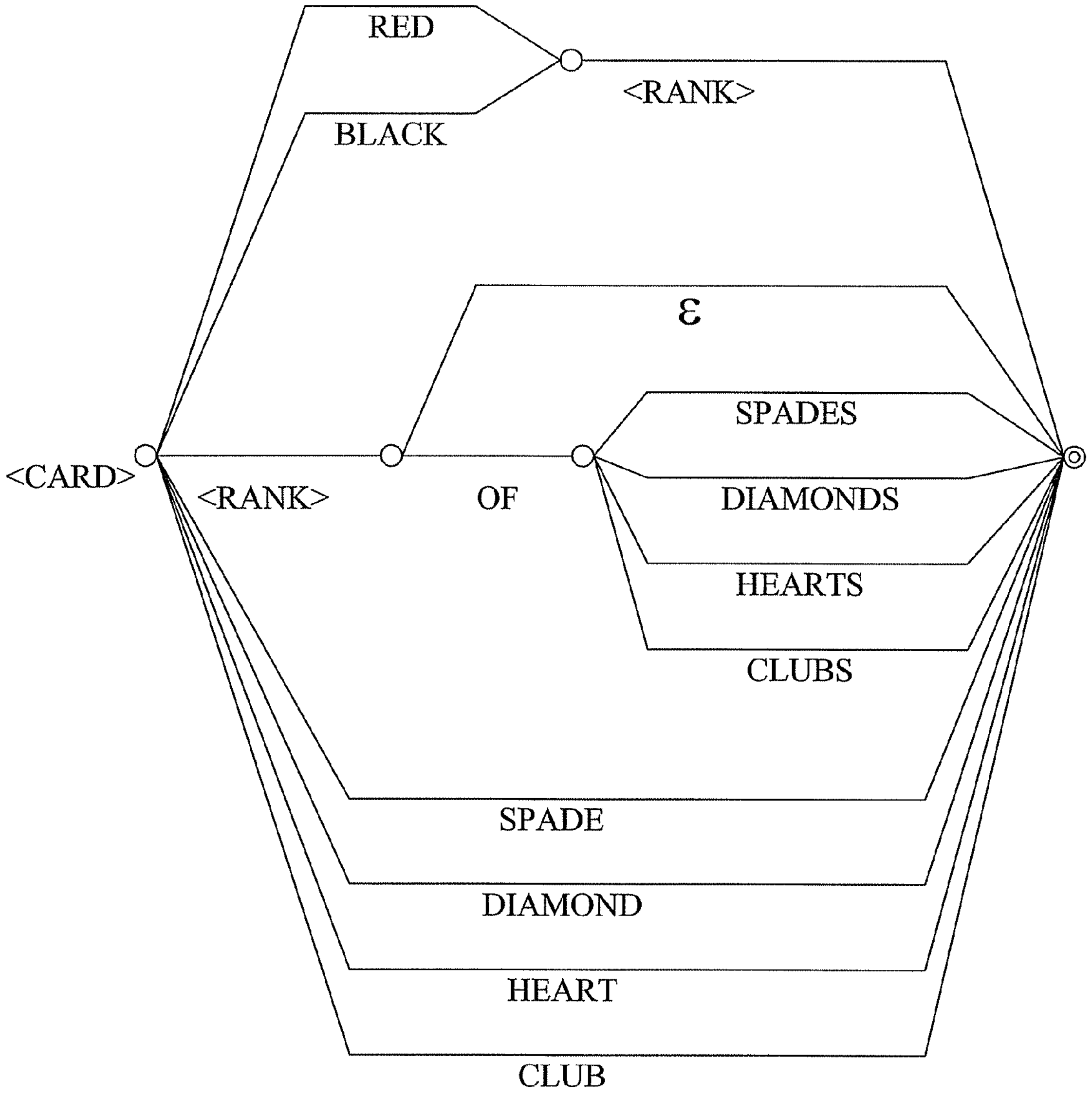
FIG. 4 is a state diagram showing the grammar structure for a single grammar rule.

The description of the tags below makes reference to FIGS. 5, 6, and 7, which show the grammar structures of FIGS. 3 and 4 described in a markup language of the present invention.

Under this embodiment of the invention, the markup language is specified using the extensible markup language (XML) standard formalism. Every XML element consists of a start tag (<some_tag>) and an end tag (</some_tag>) that contain a case sensitive tag name and that delimit a set of elements. If there are no elements, the start tag and end tag can be combined to form a single tag (<some_tag/>).

Each XML element can also be defined as having one or more attributes. Attributes of an XML element appear inside the start tag. Each attribute is in the form of name, followed by an equal sign and a string, which must be surrounded by either single or double quotation marks. An attribute of a given name may only appear once in a start tag.

The <Grammar> Tag

The <GRAMMAR> tag is the outermost tag and delimits an entire context-free grammar. The <GRAMMAR> tag has global grammar attributes including a LANGID attribute that identifies the language associated with the grammar. The language identifier is specified as a hex decimal value. For example, the LANGID for English (U.S.) is expressed in hexadecimal form as 409.

FIGS. 5 and 7 show examples of the <GRAMMAR> tag. In FIG. 5, the starting <GRAMMAR> tag 500 is shown at the beginning of the description of the grammar of FIGS. 5, 6, and 7. In FIG. 7, ending tag 700 designates the end of this grammar. In starting <GRAMMAR> tag 500, the LANGID attribute is set to "1033", which is equivalent to the hexadecimal value 409.

The <GRAMMAR> tag has two direct children, the <DEFINE> tag and the <RULE> tag. Other tags and text are only allowed if they appear within a pair of <DEFINE> tags or a pair of <RULE> tags.

The <Define> Tag

The <DEFINE> tag specifies a group of <ID> tags, which are used to associate a property ID name with a property ID value and to associate a Rule ID name with a Rule ID value. This allows the grammar author to use a character-based name instead of a number for a property ID or Rule ID so that the property ID or Rule ID is more intuitive when reading the text-formatted grammar.

FIG. 5 includes a <DEFINE> start tag 502 and a <DEFINE> end tag 504 that define a block of <ID> tags 506.

The <ID> Tag

The <ID> tags typically do not have elements, and as such, a single start/end tag is typically used. For example, <ID> tag 508 is a single start/end tag. Each <ID> tag can have two attributes of NAME and VAL. The NAME attribute provides a name string that will be used in the remainder of the grammar. This string appears between single or double quotes. The VAL attribute is an integer value associated with the name and can have any 32-bit value. During compiling, the integer value found for the VAL attribute is replaced for the name string of the NAME attribute throughout the grammar.

The <Rule> Tag

The <RULE> tag delimits a grammar structure and provides a NAME attribute that allows the structure to be referenced by name both internally and externally to the grammar. The grammar structure may be alternatively referenced by the <RULE> tag's ID attribute, which is a constant value or variant type.

Another attribute of the <RULE> tag is the TOPLEVEL attribute, which indicates whether this is a top-level grammar structure. TOPLEVEL structures can be examined by the speech recognition engine at any time and do not require that the engine to be in a particular state. Rules that are not top-level, cannot be accessed by the speech recognition engine unless it encounters a grammar structure transition that makes reference to the rule.

The possible values for the TOPLEVEL attribute are active or inactive. When rules are initially loaded into the speech recognition engine, they are inactive. To activate a rule, the application passes an instruction through the context-free engine to the speech recognition engine to activate the rule. The value of the TOPLEVEL attribute is used to simplify this process. Instead of sending a separate instruction to activate each individual rule, the application can send a single instruction to activate all rules that have a TOPLEVEL attribute set to "active". If the TOPLEVEL attribute has a value of inactive, the rule remains inactive until the context-free grammar engine receives a specific instruction from the application to activate that particular rule. Note that as long as the TOPLEVEL attribute is listed, the rule will be considered a top-level rule regardless of whether the value is active or inactive.

A further attribute that can be found in the rule tag is the EXPORT attribute. This tag specifies whether the rule can be imported or referenced by another grammar structure. The attribute may have values of 0 or 1, where 1 enables other grammar structures to import the rule, and 0 prevents other grammar structures from importing the rule. (In some embodiments, other values such as true/false or yes/no will be treated the same as 1/0)

The <RULE> tag also includes an INTERPRETER attribute that indicates whether a section of computer-executable code is to be invoked when the grammar structure delimited by the <RULE> tags is identified from the speech signal. When the INTERPRETER attribute is set to 1, code is executed. When the grammar structure is identified from the speech signal when the INTERPRETER attribute is set to 0, code is not executed when the grammar structure is identified.

As will be shown in more detail below, the code associated with the INTERPRETER attribute receives the semantic values assigned within the grammar structure delimited by the <RULE> tags. The code can also return one or more semantic property strings that are associated with particular semantic properties.

A grammar structure may also be identified as being dynamic by setting a DYNAMIC attribute in the <RULE> tag. When the DYNAMIC attribute is set to 1, the context-free grammar engine will allow the application to change the rule after it has been loaded into the grammar engine. If the DYNAMIC attribute is set to 0, the grammar structure is not considered dynamic by the context-free grammar engine.

The last attribute of the <RULE> tag is the TEMPLATE attribute. The TEMPLATE attribute allows the author to specify that values of certain semantic properties are to be returned to the application in place of the words of the grammar structure when the grammar structure is identified from the speech signal. In addition, the TEMPLATE attribute allows the author to specify an appearance for these property values. For example, if the grammar structure contained semantic properties of MONTH, DAY, and YEAR, the TEMPLATE attribute could be set to TEMPLATE="$MONTH$/$DAY$/$YEAR$". This would cause the returned recognition for the grammar structure between the <RULE> tags to be replaced by the month, day, and year separated by slashes. For example, if MONTH had a value of 10, DAY had a value of 2, and YEAR had a value of 98, the output for the rule would be 10/2/98.

In FIG. 5, several <RULE> tags are shown. For example, start <RULE> tag 510 and end <RULE> tag 512 delimit the <playcard> grammar structure found in FIG. 3. In start rule tag 510, the name of the rule is set to "playcard" by the NAME attribute, and the rule is indicated as being a top-level rule by the existence of the TOPLEVEL attribute. Since the TOPLEVEL attribute is set to active, this rule will be activated by a single instruction to activate all rules that have the TOPLEVEL attribute set to active. The rule is also capable of being exported as indicated by the fact that the EXPORT attribute is set to 1.

The <Resource> Tag

<RESOURCE> tags are used to identify a loaded object, a local file, or a remote file located on an attached network that can be used during recognition or by a rule interpreter. The different resources are distinguished from each other by a NAME attribute, which identifies the resource.

To obtain the string value that indicates the location of the resource, the interpreter's code or the speech recognition engine can query the context-free grammar engine for the string value associated with a resource name. Once the interpreter or recognition engine has retrieved the string value, it can locate and open the resource directly.

Under one embodiment, the resource can be a file name for scripting code to be used by an interpreter. In such embodiments, the interpreter is a script interpreter, which merely executes the scripted code.

The <Script> Tag

The <SCRIPT> tag is used to delimit script code that is to be interpreted when a grammar structure within a pair of <RULE> tags is identified from a speech signal. This script code is executed after the rule it is located in is completely parsed. Thus, after a particular path through the rule has been identified and the properties along that path have been set, the scripting code within the <SCRIPT> tags is executed. This allows the script code to utilize the values of the properties defined within the grammar structure. The code within the <SCRIPT> tags can be used in place of or in conjunction with an external interpreter.

The <Ruleref> Tag

The <RULEREF> tag is used to reference a rule from within an existing grammar structure. Since a <RULEREF> tag has no contents, it typically appears as a single start/stop tag.

The primary attribute of the <RULEREF> tag is the name attribute, which specifies the name of the rule that is being referenced. Under one embodiment of the invention, a rule may be referenced in a grammar before it has been declared in the grammar. The referenced rule may be identified by its ID instead of its name by using the REFID attribute in the <RULEREF> tag.

The <RULEREF> tag may be used to reference a rule that has yet to be loaded into the context-free grammar engine. To identify such a rule, either an OBJECT attribute or a URL attribute is used to specify the location from which the rule should be loaded. The OBJECT attribute is used to specify a class identifier or programmatic identifier that indicates the location of the grammar object that contains the rule. The URL attribute is used to identify a stored file (file://directory_name/sum_file_name.xml), a resource (res://directory_name/sum_resource.dll), or an internet location (stp://www.microsfot.com/sum_resource.dll) that contains the rule.

If the rule being referenced includes an interpreter that is to be executed, the OBJECT attribute of the <RULEREF> tag is set to the class identifier or program identifier for the interpreter.

The <RULEREF> tag also has a PROPNAME attribute and a PROPID attribute that identify a semantic property to be associated with this rule reference as well as a VAL attribute, which indicates a value for the property. If the VAL attribute is set within the <RULEREF> start tag, the property identified by the PROPNAME attribute is set to the value of the VAL attribute. If the VAL attribute is not included in the <RULEREF> tag, the text recognized by the referenced rule becomes the property value for the property specified by the PROPNAME attribute. The value for the semantic property identified by the PROPNAME attribute may also be identified indirectly using the VALSTR attribute, which contains a string identifier of the VAL element.

Lastly, the <RULEREF> tag includes a WEIGHT attribute that specifies the relative list position of the rule referenced by the <RULEREF> tag. This WEIGHT attribute is expressed as a float value and is provided to the speech recognition engine to bias the engine toward recognizing one item in a list over other items.

FIG. 5 shows a <RULEREF> tag 520 within <movecard> rule 522. <RULEREF> 520 has a NAME attribute set equal to "card" indicating that the <card> rule is to be referenced. The PROPNAME attribute is set to "from", and because the VAL attribute has not been set, the "from" property will be set equal to the words that are recognized by the <card> rule. The <card> rule itself is found in FIG. 6 as rule 600.

The <Phrase> or <P> Tag

The <PHRASE> tag, which has an alternative short form of just <P>, is used to delimit a grammar sub-structure that begins from a single state and ends at another single state. Between the two states, the elements of the phrase tag can be one or more words or a combination of words and tags that define multiple paths and multiple intermediate states between the two end states.

Example of the different uses for the <PHRASE> tag can be found in FIG. 5. Specifically, phrase tags 530 and 532 define the start and the end of a phrase. Within these phrase tags, a set of list tags 534 and 536 define two alternative paths, each of which are defined by additional phrase tags 538, 540, 542, and 544. After list tag 536, additional phrase tags 546 and 548 provide an additional word element.

The structure represented between phrase tags 530 and 532 of FIG. 5 is shown in FIG. 3 as extending from state 350 of FIG. 3 to state 360. The phrase tags found within list tags 534 and 536 define "put" transition 354 and "move" transition 356, of FIG. 3. Phrase tags 546 and 548 define the word transition for the word "the" in FIG. 3 from state 358 to state 360.

The <PHRASE> tag has several optional attributes including PROPNAME and PROPID attribute that are used to designating the name and id, respectively, of a property associated with the recognition of the grammar sub-structure between the <PHRASE> tags. A VAL attribute or a VALSTR attribute can optionally be set in the <PHRASE> start tag to designate the value or a string containing a value identifier for the property specified by the PROPNAME attribute. Thus, if the speech recognizer identifies the grammar sub-structure within the <PRHASE> tags, the name associated with the PROPNAME attribute will be set to the value associated with the VAL attribute or the value identified by the VALSTR attribute. If there is no VAL or VALSTR attribute, the property identified by the PROPNAME attribute will be set to null.

The author of the context-free grammar can also designate a pronunciation for a single word between <PHRASE> tags. This is done by setting the PRON attribute of the phrase tag equal to a phoneme description of the pronunciation. Table 1 below provides example phoneme descriptions that can be used under one embodiment of the present invention.

TABLE 1

| SYM | Example | PhoneID |
|---|---|---|
| - | syllable boundary (hyphen) | 1 |
| ! | Sentence terminator (exclamation mark) | 2 |
| & | word boundary | 3 |
| , | Sentence terminator (comma) | 4 |
| . | Sentence terminator (period) | 5 |
| ? | Sentence terminator (question mark) | 6 |
| _ | Silence (underscore) | 7 |
| 1 | Primary stress | 8 |
| 2 | Secondary stress | 9 |
| aa | father | 10 |
| ae | cat | 11 |
| ah | cut | 12 |
| ao | dog | 13 |
| aw | foul | 14 |
| ax | ag0 | 15 |
| ay | bite | 16 |
| b | big | 17 |
| ch | chin | 18 |
| d | dig | 19 |
| dh | then | 20 |
| eh | pet | 21 |
| er | fur | 22 |
| ey | ate | 23 |
| f | fork | 24 |
| g | gut | 25 |
| h | help | 26 |
| ih | fill | 27 |
| iy | feel | 28 |
| jh | joy | 29 |
| k | cut | 30 |

TABLE 1-continued

| SYM | Example | PhoneID |
|---|---|---|
| l | lid | 31 |
| m | mat | 32 |
| n | no | 33 |
| ng | sing | 34 |
| ow | go | 35 |
| oy | toy | 36 |
| p | put | 37 |
| r | red | 38 |
| s | sit | 39 |
| sh | she | 40 |
| t | talk | 41 |
| th | thin | 42 |
| uh | book | 43 |
| uw | too | 44 |
| v | vat | 45 |
| w | with | 46 |
| y | yard | 47 |
| z | zap | 48 |
| zh | pleasure | 49 |

The author of the context-free grammar may also specify the display form for the text elements between the <PHRASE> tags. This is done by assigning a string representing the display form to the DISP attribute.

In one embodiment, the context-free grammar author may also specify the display format and the pronunciation without using the PRON attribute or the DISP attribute. To do this, the author uses an alternative format when designating a word within the <PHRASE> tags. Specifically, the author designates the words as: <P>/display_form/lexical_form/pronunciation;</P>

In this format, the beginning slash after the first <P> tag indicates that this is the alternative format for specifying a word. The display format is then specified followed by another forward slash. The lexical form of the word, that is the form in which the word appears in the lexicon, is then provided followed by a third forward slash. The phoneme description of the word's pronunciation is then provided in a space-delimited format followed by a semicolon indicating the end of the pronunciation. Note that any of these elements may be omitted as long as the forward slashes remain.

The <PHRASE> tag also provides a set of attributes to make it easier to identify repeated occurrences of the same word or phrase. The MIN attribute designates the minimum number of repetitions that the speech recognition engine must identify in order to identify this phrase structure, and the MAX attribute indicates the maximum number of times the contents between the <PHRASE> tags may be repeatedly recognized. Note that the MAX attribute may be set to "INF" indicating that an infinite number of repetitions of the text between the <PHRASE> tags may be recognized as part of this phrase.

As with the <RULEREF> tag, the <PHRASE> tag includes a WEIGHT attribute that can be used to bias the speech recognition engine toward or away from this particular phrase when considering the likelihood of the phrase in the context of one or more possible options in a list.

The grammar author can also indicate to the speech recognition engine the level of confidence that is required of the recognition in order for this word to be identified. In one embodiment, this is done by placing a plus or a minus before the word as shown in FIG. 5 for words 560 and 562. Word 560 is the word "game", which is preceded by a plus sign. This indicates to the speech recognition engine that it needs to have a high confidence level for identifying the word "game" before it can identify the <newgame> grammar structure.

Word 562 is the word “please”, which is preceded by a minus indicating to the speech recognition engine that even if it has low confidence that user actually said “please”, it may still identify the <newgame> grammar structure.

The <List> Tag or <L> Tag

The <LIST> tag, which has a short form of <L>, is used to designate a list of alternate phrase elements. For example, list tags 534 and 536 of FIG. 5 designate the word “move” as an alternate for the word “put”. Each sub-element provided within the <LIST> tags represents a possible separate recognition that could be attributed to the <LIST> tag.

The <LIST> tag has PROPNAME and PROPID attributes that designate the name and ID, respectively, of a semantic property to be associated with the recognition of at least one of the alternate phrases in the list. The value for the semantic property identified by the PROPNAME attribute can be set using the VAL attribute or the VALSTR attribute in one of the <PHRASE> tags in the list. When the phrase is identified by the speech recognition engine, its corresponding value for the VAL attribute will be assigned to the property identified by the PROPNAME attribute in the list tag. If there are no VAL attributes in the list of alternatives, the property for the list will be set to null.

In one embodiment, the <LIST> tag has an alternate form, designated as <LN>, in which the alternates within the <LN> tags are each listed between specialized phrase tags <PN>.

An example of this format is shown in FIG. 7 where <LN> tags 710 and 712 define a list of alternate phrase elements that are each identified between two <PN> tags such as element 714. The semantic property associated with the list is identified as “rank” by PROPNAME attribute 716 in starting <LN> tag 710. The value of the rank property is set based on which of the alternates is selected. This is done using the VAL attribute in the specialized <PN> tag. For example, the VAL attribute is set to “2” for element 714. Thus, when the word “two” is recognized, the rank will be set equal to the number “2”.

The <OPT> or <O> Tag

The <OPT> tag, which as a alternative short form of <O>, is similar to the <PHRASE> tag except that the <OPT> tag indicates that the element between the tags is optional. Like the <PHRASE> tag, the <OPT> tag has attributes of PROPNAME, PROPOID, VAL, VALSTR, MAX, and MIN. The property identified by the PROPNAME attribute will only be set equal to the value identified by the VAL attribute if the elements between the <OPT> tags are actually recognized.

The <OPT> tag may span a single word as found in FIG. 5 for the word “please”, which is between <O> tags 570 and 572. Alternatively, the <O> tags may enclose a larger grammar sub-structure. For example, in FIG. 6, <O> tags 620 and 622 enclose a phrase designated by <P> tags 624 and 626 and a list designated by <L> tags 628 and 630. Thus, the whole structure between <O> tags 620 and 622 is optional. In other words, even if the user does not say any of the phrases “of clubs”, “of hearts”, “of diamonds”, or “of spades”, the <card> rule can still be identified if the other elements within the <card> rule are recognized.

The <O> tag corresponds to the epsilon transitions designated in FIG. 3. Thus, because of the nesting nature of the markup language, it is easy for authors to designate a set of optional transitions for the state diagram.

One embodiment of the invention provides an alternative format for designating a word as optional. Under this alternative format, the word is preceded by a question mark to indicate that the word itself is optional.

The <Dictation> Tag

The <DICTATION> tag is a grammar switch tag that instructs the speech recognition engine to switch from the context-free grammar to a dictation grammar during the recognition of one or more words. Thus, when the speech recognition engine encounters a <DICTATION> tag, it transitions to a separate, usually less restrictive, dictation grammar to perform its speech recognition.

By default, each <DICTATION> tag is used to represent the identification of a single word from the speech signal. To retrieve the word that has been dictated, the author can use the PROPNAME attribute of the <DICTATION> tag to set a property name that will receive the dictated text. As with a <PHRASE> tag, the <DICTATION> tag has a MIN attribute and a MAX attribute that can be used to repetitively recognize the same word.

One embodiment of the present invention provides an alternative markup to using the dictation tag. In this alternative mark-up, the star symbol, “*”, is used between <PHRASE> tags to indicate that the speech recognition system should transition to the dictation grammar during this phrase. A “*+” is used to indicate that the dictation crosses more than one word.

The <Textbuffer> Tag

Instead of transitioning to a dictation grammar, the present invention also provides a means for transitioning to a grammar constructed from a null-terminated string. This is done using the <TEXTBUFFER> tag, which is another switch grammar tag.

Each composite grammar created by the context-free grammar engine includes a text buffer that can be populated by the application. In one embodiment, this text buffer is populated using an Application Programming Interface call named SETWORDSEQUENCEDATA.

When the speech recognition engine reaches a <TEXTBUFFER> tag, it searches through the text buffer for any sub-sequence in the text buffer that matches the speech signal. Thus, if the text buffer included a list of names such as “Bill Smith”, “Judy Jones”, and “Phil Connors”, the speech recognition engine would return the word “Judy” if the user just said “Judy”, and would return the words “Judy Jones” if the user said the entire phrase “Judy Jones”.

The text identified from the text buffer is returned and set equal to the name identified in the PROPNAME attribute, unless the VAL attribute has been set in the <TEXTBUFFER> tag.

Like the <PHRASE> tag, the <TEXTBUFFER> tag also has a WEIGHT attribute, which can be used to indicate to the speech recognition engine the relative weighting to be assigned to this element if it appears in a list.

The <Wildcard> Tag

The <WILDCARD> tag indicates to the speech recognition engine that it should ignore words occurring between phrases preceding the <WILDCARD> tag and phrases coming after the <WILDCARD> tag. Thus, the <WILDCARD> tag can be used to indicate a transition in which it does not matter what the user says during the transition as long as they speak the remaining phrases in the rule. This <WILDCARD> tag is represented in the state diagram of FIG. 3 by transition 326.

One embodiment of the present invention provides an alternative markup to using the <WILDCARD> tag itself. This alternative markup uses " . . . " between <PHRASE> tags to indicate the wild card.

The Interpreter

As discussed above, a rule can designate that an interpreter be invoked when the grammar structure delimited by the <RULE> tags is identified by the speech recognition engine. The interaction of rules that use interpreters, and especially their effects on semantic properties, are described below in connection with an example grammar depicted in FIGS. 8-15 and a semantic parse tree depicted in FIGS. 16-18.

Figures 15, 16:
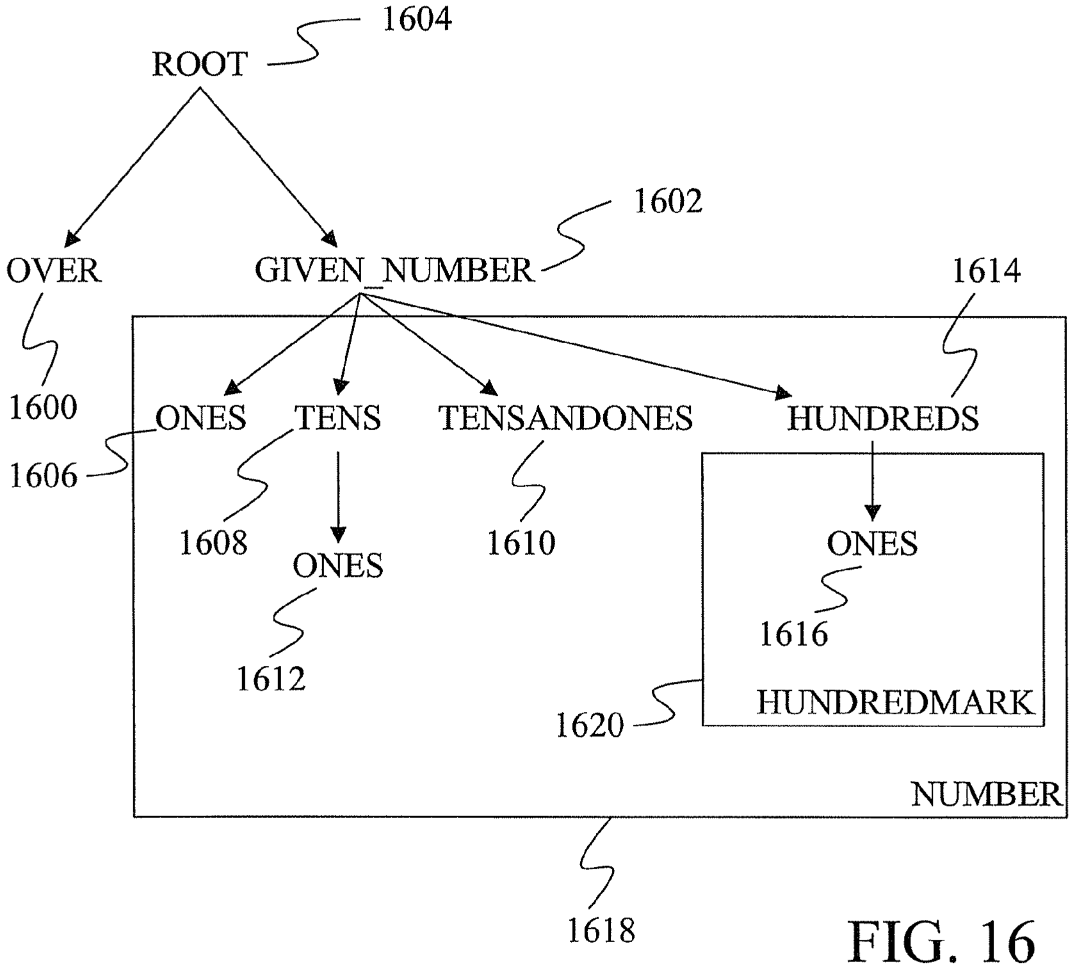

FIGS. 13, 14, and 15 provide a grammar used in this example and written in the markup language of the present invention. This grammar includes one top-level rule designated by <RULE> tag 1300, named <moreorless>. This top-level rule is shown in state diagram form in FIG. 8. The rule starts from start node 800 and extends along two parallel transitions 804 and 806 to state 802. Word transition 804 is associate with the word "more" and word transition 806 is associated with the word "less". State 802 is joined to state 808 by an additional word transition for the word "than". Lastly, a rule transition for the rule <number> extends from state 808 to state 812.

The alternative paths from state 800 to state 802 are represented by <LN> tags 1302 and 1304 of FIG. 13. The list tags are associated with a property identified by the property name "over". The "over" property can have values of one or zero depending on whether the word "more" or the word "less" is identified, as represented by the VAL attributes of <PN> tags 1306 and 1308.

Figure 8:
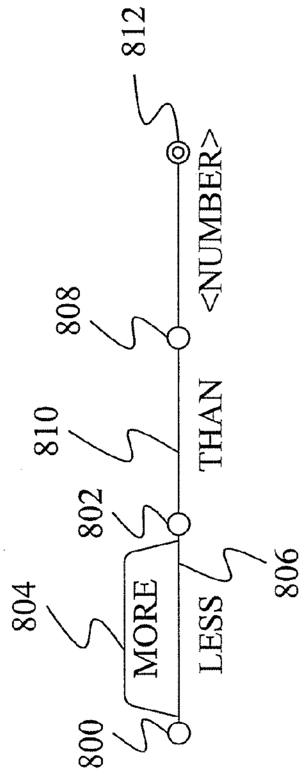
FIG. 8 is a state diagram of grammar rule "moreorless".

The transition from state 802 to state 808 in FIG. 8, is represented by the phrase element between <P> tags 1310 and 1312 of FIG. 13. The transition from state 808 to 812 is represented by <RULEREF> tag 1314 of FIG. 13. This <RULEREF> tag makes reference to a rule entitled <number> and provides a property name of "givennumber" to receive the results produced within the <number> rule.

Figure 9:
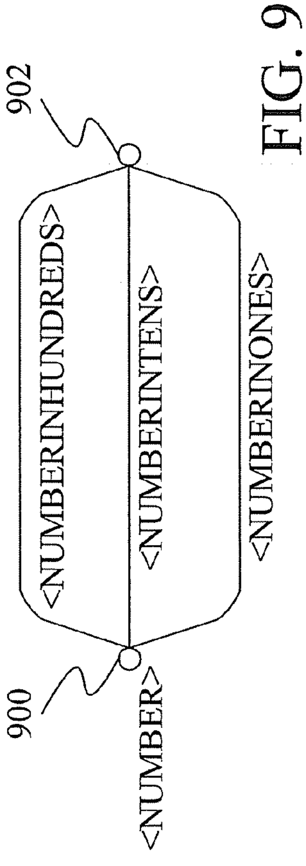
FIG. 9 is a state diagram of grammar rule "number".

A state diagram for the <number> rule is shown in FIG. 9. The state diagram consists of three parallel transitions from an initial state 900 to an ending state 902. Each of the alternate transitions is a rule transition corresponding to rules <numberinones>, <numberintens>, and <numberinhundreds>.

The <number> rule is defined in FIG. 13 between <RULE> tags 1320 and 1322. In starting <RULE> tag 1320, the INTERPRETER attribute has been said equal to 1. This indicates that the <number> rule has an associated interpreter that will be invoked when the rule has been fully parsed. The alternative paths between states 900 and 902 of FIG. 9 are shown by <L> tags 1324 and 1326. The alternates provided within <L> tags 1324 and 1326 are each rule references, making references to separate rules. In particular, rule reference 1328 refers to the <numberinhundreds> rule, rule reference 1330 refers to the <numberintens> rule, and rule reference 1332 refers to the <numberinones> rule.

Figure 10:
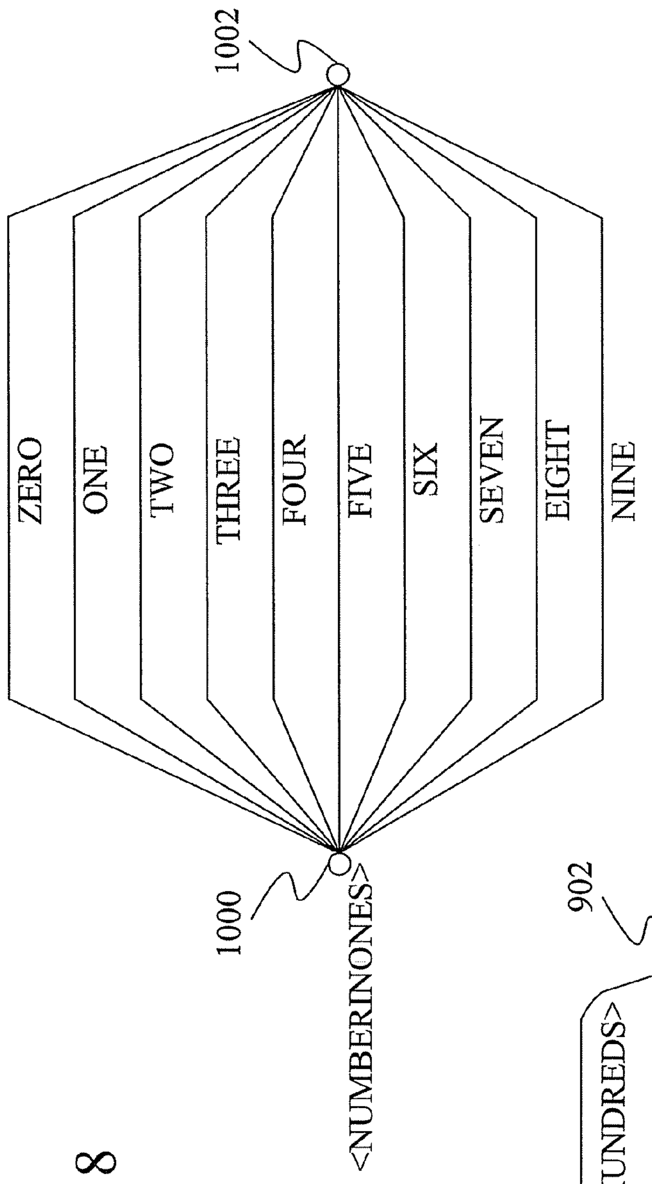
FIG. 10 is a state diagram of grammar rule "numberinones".

A state diagram for the <numberinones> rule is shown in FIG. 10. The state diagram consists of ten alternatives, each representing a separate single digit number. The <numberinones> rule is defined in FIG. 13 between <RULE> tags 1340 and 1342. As can be seen in starting <RULE> tag 1340, this rule is not associated with an interpreter.

The alternatives from state 1000 to state 1002 of FIG. 10 are represented between <LN> tags 1344 and 1346 of FIG. 13. These list tags include a property name of "ones" that is associated with a value based on which of the digits the user speaks. For example, if the user says three, the ones property will be set to a value of "3" as indicated by the VAL attribute in <PN> tag 1348.

Figure 11:
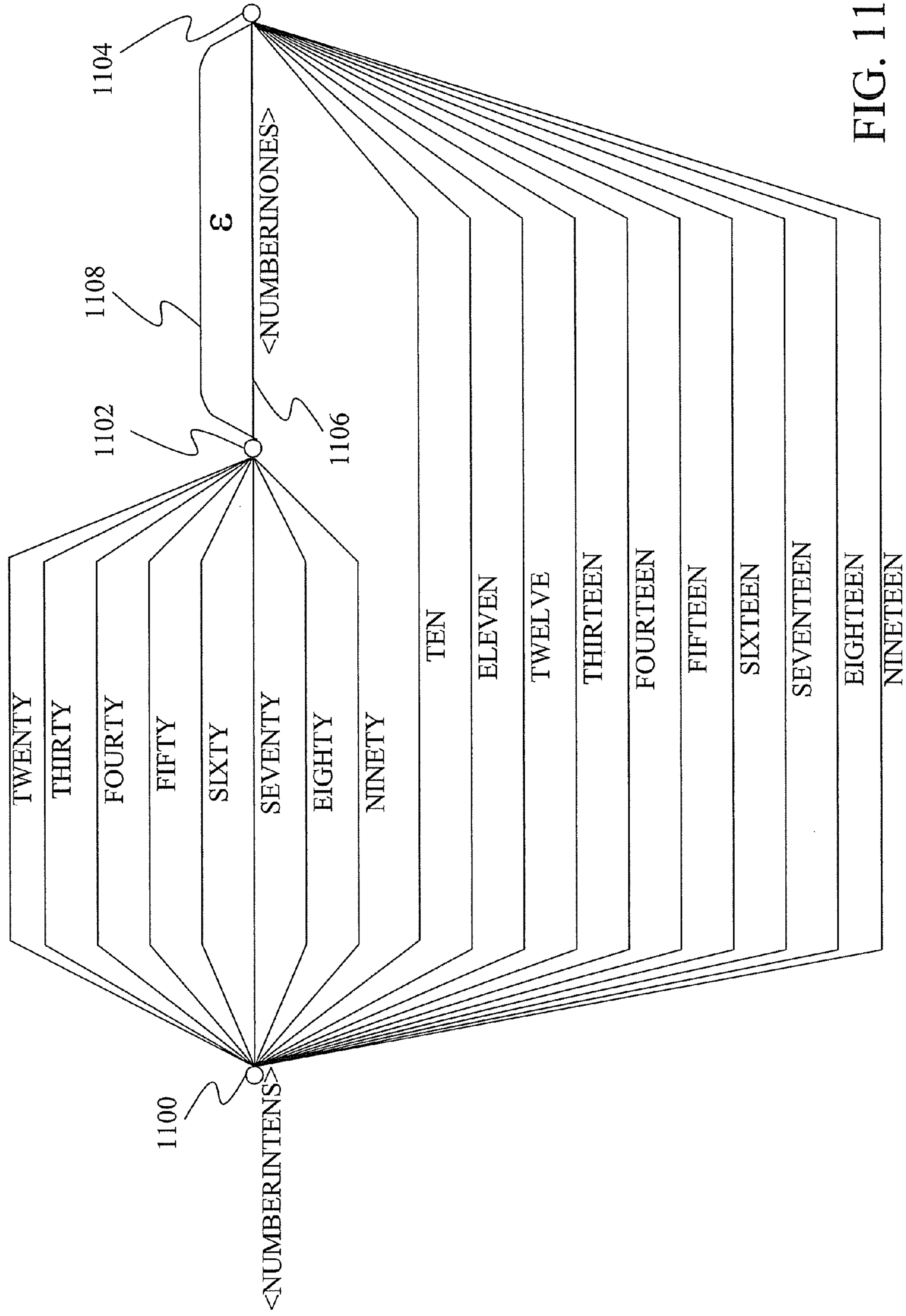
FIG. 11 is a state diagram of grammar rule "numberintens".

The <numberintens> rule from FIG. 9 is represented in a state diagram in FIG. 11 and is described in a markup language in FIG. 14. As can be seen in FIG. 11, the <numberintens> rule has three states, 1100, 1102, and 1104. In FIG. 11, there is a set of alternative transitions from state 1100 to state 1102. Each of these transitions is associated with a tens number such as twenty, thirty, forty and so forth up to ninety. From state 1102 to state 1104, there is an optional rules transition 1106 that references the <numberinones> rule. This optional transition is indicated by epsilon transition 1108. Thus, if the user says forty-two, the speech recognizer will identify the path from 1100 to 1102 across the word forty, and from state 1102 to state 1104 across the <numberinones> rule for the word two.

The state diagram of FIG. 11 also includes a set of alternate transitions from state 1100 directly to state 1104. These alternate transitions are word transitions representing the words from ten to nineteen.

In FIG. 14, the <numberintens> rule appears between <RULE> tags 1400 and 1402. The alternative pathways for transitioning between state 1100 to state 1104 is represented by an outer set of <L> tags 1404 and 1406. The structures within these outer list tags represent both the transitions from state 1100 through state 1102 to state 1104 as well as the transitions from 1100 to state 1104 directly.

The transitions from state 1100 through state 1102 and then to state 1104 are found within <P> tags 1408 and 1410. The alternate transitions from state 1100 to state 1102 are found within <LN> tags 1412 and 1414, within <P> tags 1408 and 1410. List tag 1412 has an associated property identified by the property name "tens". This property name is set equal to a value between two and nine depending on the word recognized by the speech recognition engine. For example, if the recognition engine recognizes the word sixty, the value for the tens property will be set equal to "6" as indicated by the VAL attribute of <PN> tag 1416.

The optional transition from state 1102 to state 1104 is indicated by <O> tags 1418 and 1420. Between these tags is a single <RULEREF> tag that 1422 that refers to the <numberinones> rule.

The alternative pathways from state 1100 directly to state 1104 are represented within <LN> tags 1424 and 1426. <LN> tag 1424 includes a property named "tensandones" which is set to a value depending on the word recognized by the recognition engine. For example, if the recognition engine recognizes the word seventeen, the "tensandones" property is set to a value of "17" as indicated by the VAL attribute of <PN> tag 1428.

Figure 12:
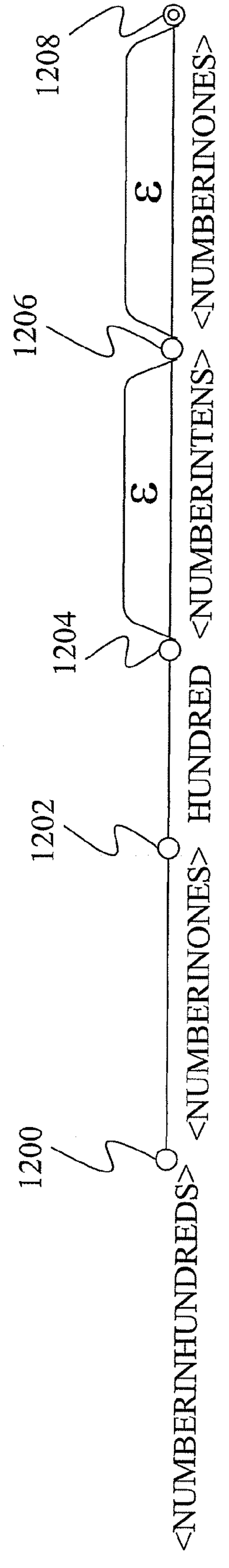
FIG. 12 is a state diagram of grammar rule "numberinhundreds".

The <numberinhundreds> rule is shown in state diagram form in FIG. 12 and in markup language form in FIG. 14. In FIG. 12, the <numberinhundreds> rule starts in state 1200 and proceeds to state 1202 across a rules transition that references the <numberinones> rule. From state 1202, a word transition extends to state 1204 for the word "hundreds". An optional rules transition that references the <numberintens> rule then extends from state 1204 to state 1206. A second optional transition extends from state 1206 to state 1208 and references the <numberinones> rule.

In FIG. 14, the <numberinhundreds> rule is defined between <RULE> tags 1450 and 1452. In the <numberinhundreds> rule, the transition from state 1200 to state 1202 of FIG. 12, is made indirectly through a rule reference represented by <RULEREF> 1454, which references a rule named <hundredmark>. The <hundredmark> rule is shown in FIG. 15 between <RULE> tags 1500 and 1502. As shown by the INTERPRETER attribute of <RULE> tag 1500, the <hundredmark> rule is associated with an interpreter. The rule includes a single element, which is a <RULEREF> tag 1504 that references the <numberinones> rule. The reason for this indirect call to the <numberinones> rule is that the <numberinones> rule is later referenced in the <numberinhundreds> rule. Since the <numberinones> rule could be active twice within the <numberinhundreds> rule, its ones property would be set twice before the <numberinhundreds> rule could convert the ones property to a hundreds property. By making an indirect reference, the ones property from rule reference 1504 can be converted into a hundreds property in rule reference 1454 of the <numberinhundreds> rule.

The transition from state 1202 to 1204 is shown in FIG. 14 by the word "hundred" between <P> tags 1456 and 1458. The optional transition from state 1204 to state 1206 is shown between <O> tags 1460 and 1462, which delimit a <RULEREF> tag 1464 that references the <numberintens> rule. Similarly, <O> tags 1466 and 1468 represent the optional transition from state 1206 to state 1208 of FIG. 12. Options tags 1466 and 1468 delimit a single <RULEREF> tag 1470, which references the <numberinones> rule.

In operation, the <moreorless> rule will be identified if the user states the words "more" or "less" followed by the word "than" and a number between 0 and 999. Within the <number> rule, the <numberinones> rule will be identified if the user states a number between 0 and 9, the <numberintens> rule will be identified if the user states a number between 10 and 99 and the <numberinhundreds> rule will be identified if the user states a number between 100 and 999.

Figure 17:
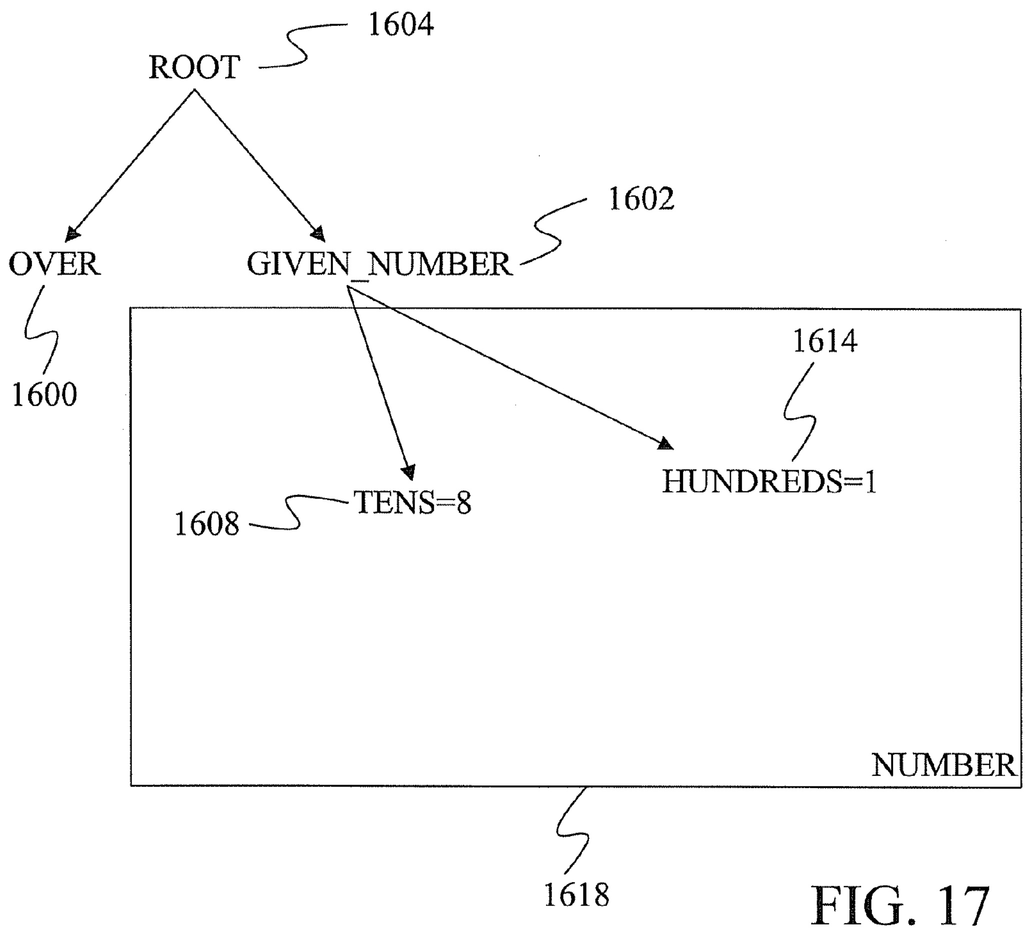
FIG. 17 is a tree diagram of the semantic tree of FIG. 16 after execution of the code associated with the "hundredsmark" rule.
Figure 18:
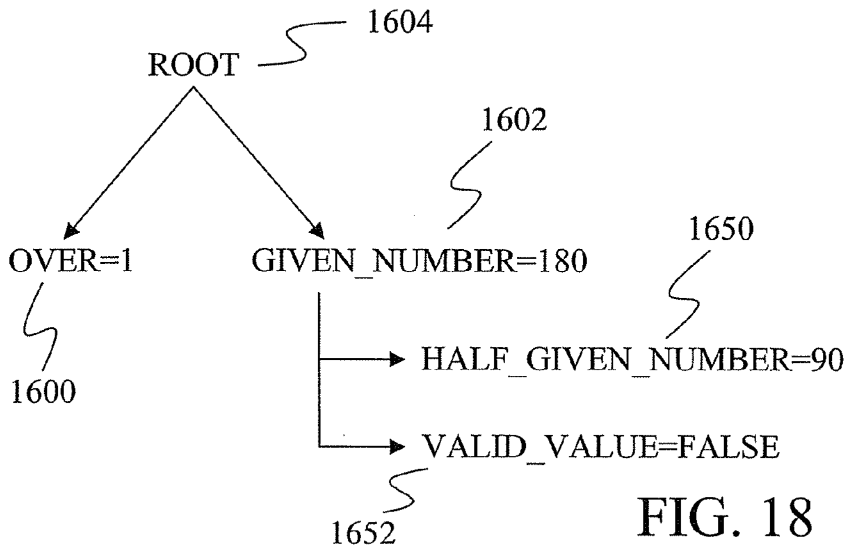
FIG. 18 is a tree structure of the semantic tree of FIG. 17 after execution of the code associated with the "number" rule.

Under the present invention, the grammar of FIGS. 13-15 is supplemented with semantic names and values that reduce the processing time that the application will need to convert the text numbers to digits. Under one embodiment, the semantic values are returned to the application through a semantic tree. FIGS. 16-18 show the evolution of the semantic tree as the context-free grammar engine constructs the tree based on the grammar of FIGS. 13-15.

FIG. 16 shows the semantic tree structure after it has been constructed from the top down by the context-free grammar engine. This involves placing the property names in their proper hierarchical relationship as defined within the grammar structure of the top-level <moreorless> rule. For example, the two outermost semantic property names are "over", which is defined in list tag 1302 of the <moreorless> rule and "givennumber", which is defined in rule reference 1314 within the <moreorless> rule. Thus, "over" and "givennumber" are shown as children nodes 1600 and 1602 of a root node 1604 in the semantic tree structure of FIG. 16.

Rule reference 1314 makes reference to the <number> rule, which further makes reference to the <numberinones> rule, the <numberintens> rule, and the <numberinhundreds> rule. The <numberinones> rule includes a property name of "ones". As such, this property name appears as a child node 1606 of "givennumber" node 1602.

The <numberintens> rule includes a property name of "tens", which appears as child node 1608 under "givennumber" node 1602. The <numberintens> rule also includes and a property name of "tensandones", which appears as child node 1610 under "givennumber" node 1602. The <numberintens> rule includes a rule reference to the <numberinones> rule, and as such includes an additional child node for the "ones" property of the <numberinones> rule. This property name appears as node 1612 under "tens" node 1608.

The <numberinhundreds> rule defines a property name of "hundreds", which appears as child node 1614 in FIG. 16. The <numberinhundreds> rule makes reference to the <hundredmark> rule, which in turns makes reference to the <numberinones> rule. As such, the "ones" property appears as a child node 1616 under the "hundreds" property node 1614.

During this expansion, the context free grammar engine generates containers to hold the property names found within rules that are associated with an interpreter. These containers prevent rules outside of the container from seeing the semantic values listed within the container. For example, the context-free grammar engine generates a container 1618 for the <number> rule that contains the "ones", "tens", "tensandones", and "hundreds" property names found below "givennumber" node 1602. Likewise, the context-free grammar engine generates a container 1620 for the "ones" property name defined within the <hundredmark> rule. Thus, only the <hundredmark> rule has access to the value of the "ones" property that has been defined within the <hundredmark> rule.

Note that the expansion of FIG. 16 does not represent an actual expansion of the semantic tree. Instead, it represents all possible expansions for the tree. In an actual expansion, only those leaf nodes associated with a recognized grammar structure would be expanded. Thus, if the user said a number between zero and nine, the only property beneath "givennumber" node 1602 would be "ones" node 1606. For a number such as "180", "tens" node 1608, "hundreds" node 1614 and "ones" node 1616 would appear below "givennumber" node 1602.

After the expansion, the context-free grammar engine attempts to set the values of the various properties beginning with the leaf nodes and working upward. If the user said "one-hundred eighty", the first leaf node that would be addressed is the "ones" property node found within the <hundredmarks> rule. To set the value for this property, the context-free grammar engine determines what number the user said before saying the word "hundreds". The "ones" property is then set equal to the digit that represents that number through the VAL attributes found in the <PN> tags between <LN> tags 1344 and 1346 of FIG. 13. For example, if the user said "one-hundred eighty", the "ones" property would be set to "1".

Next, the context-free grammar engine sets the value for the "hundreds" property. As noted above, a property that is named in a rule reference through the PROPNAME attribute, is set equal to the output of the rule. If the rule does not have an interpreter, the output of the rule is the words recognized by the speech recognition engine. However, if the rule has an interpreter, the output of the rules is the output of the interpreter.

Thus, because the "hundreds" property is named in a rule reference to the <hundredmark> rule, determining the value of the "hundreds" property involves invoking the interpreter that has been associated with the <hundredmark> rule. Under the example above, the interpreter for the <hundredmark> rule receives the value assigned to the "ones" property and returns this value as its output. Thus, the "hundreds" property is set equal to the value of the "ones" property. In the specific example where the user says "one-hundred eighty", the "hundreds" property is set to "1".

The context-free grammar engine then continues to attempt to set values for the properties in the tree. For the example where the user says "one-hundred eighty" this involves setting the “tens” property to “8” based on the VAL attribute found in the <PN> tag for eighty in the <numberintens> rule.

FIG. 17 shows the state of the tree after the properties under “givennumber” have been assigned values. In FIG. 17, only those properties that correspond to the user saying “more than one-hundred eighty” are shown. Note that the identified values for the properties under the “givennumber” node are maintained within container 1618 in FIG. 17.

Moving up to the next level of nodes in the semantic tree, the context free grammar engine first sets the value for the “over” property based on whether the user said “more” or “less”. As shown by <P> tags 1306 and 1308, if the user says “more”, the “over” value is set to “1”, and if the user says “less”, the “over” value is set to “0”. In the present example, the user has said “more”, so the “over” property is set to “1” as shown in FIG. 18.

To resolve the “givennumber” property, the context-free grammar engine invokes the interpreter associated with the <number> rule because the “givennumber” property name is found in a rule reference to the <number> rule. This interpreter receives all of the property names and their values found within container 1618. Note that none of the property names or values within container 1618 are available outside of the container. Using these property names and values, the number interpreter constructs a three-digit number representing the number spoken by the user. In particular, this interpreter identifies which properties have not had their values set (indicated by a null value for the property, changes each null value to a 0, and then calculates a number using:

$$\text{number}=(\text{hundreds}\times 100)+(\text{tens}\times 10)+\text{ones}+\text{tensandones} \qquad \text{EQ. 1}$$

The interpreter for the number rule also generates a property identified as “half_given_number” by dividing the number calculated in Equation 1 by two. Further, the interpreter determines whether this is a valid value by comparing the number to a set of valid values stored in a registry or file. If it is a valid value, the interpreter sets a “valid_value” property to true, otherwise the “valid_value” property is set to false.

The number interpreter returns the number as its output, and this number is set as the value of the “givennumber” property. In addition, the number interpreter returns a list of additional property/value pairs that it has determined. Such additional property/value pairs can be returned to the application or used by rules higher in the hierarchy. Thus, using the example of FIG. 17, the “givennumber” property is set to a value of “180” in FIG. 18. Furthermore, the tree is expanded to include children nodes of node 1602 that each designate a property provided by the number interpreter. In particular, node 1650 includes the “half_given_number” property and value and node 1652 includes the “valid-value” property and value. The structure of FIG. 18 is the final semantic structure for the <moreorless> rule and is returned to the application.

Although the present invention has been described with reference to particular embodiments, workers skilled in the art will recognize that changes may be made in form and detail without departing from the spirit and scope of the invention.

What is claimed is:

1. A computer storage medium encoded with computer-executable instructions that when executed by a processor cause the processor to perform steps comprising:

sending a grammar to a speech recognition system to perform speech recognition on a speech signal, the grammar comprising:

a grammar structure delimited with rule tags that conform to a markup language, the grammar structure representing at least one word to be recognized from the speech signal by the speech recognition system; and all of the rule tags for the grammar delimited with grammar tags that conform to a markup language.

2. The computer storage medium of claim 1 wherein the rule tags comprise a name attribute so that the grammar structure can be referred to by the name of the rule tags.

3. The computer storage medium of claim 1 wherein the rule tags comprise a value for an interpreter attribute to indicate that code is to be invoked when the grammar structure delimited by the rule tags is recognized from a speech signal.

4. The computer storage medium of claim 3 further comprising a resource identifier delimited within resource tags within the rule tags to identify a resource to be provided to the code associated with the interpreter attribute.

5. The computer storage medium of claim 1 further comprising script code delimited within script tags between the rule tags, the script code to be interpreted when the grammar structure delimited by the rule tags is recognized from a speech signal.

6. The computer storage medium of claim 1 wherein rule tags comprise a semantic property identifier attribute such that the semantic property identified by the semantic property identifier attribute is set equal to a value when the grammar structure delimited by the rule tags is recognized from a speech signal.

7. The computer storage medium of claim 1 further comprising at least one word of the grammar structure delimited with phrase tags.

8. The computer storage medium of claim 7 wherein the phrase tags comprise a semantic property identifier attribute and a semantic property value attribute such that the semantic property identified by the semantic property identifier attribute is set equal to semantic property value when the at least one word delimited by the phrase tags is recognized from a speech signal.

9. The computer storage medium of claim 1 further comprising a list of alternative grammar sub-structures delimited with list tags.

10. The computer storage medium of claim 9 wherein the list tags comprise a semantic property identifier attribute such that the semantic property identified by the semantic property identifier attribute is set equal to a value when at least one of the grammar sub-structures in the list of alternative grammar sub-structures is recognized from a speech signal.

11. The computer storage medium of claim 1 further comprising an optional grammar sub-structure delimited as optional such that the grammar structure delimited by the rule tags can be recognized from a speech signal regardless of whether the optional grammar sub-structure is recognized from the speech signal.

12. The computer storage medium of claim 1 further comprising a grammar switch tag in the grammar structure to indicate that a different grammar should be used to recognize at least one word from a speech signal.

13. The computer storage medium of claim 12 wherein the grammar switch tag comprises a dictation tag to indicate that a dictation grammar should be used to recognize at least one word from the speech signal.

14. The computer storage medium of claim 12 wherein the grammar switch tag comprises a text buffer tag to indicate that sub-sequences of words from a sequence of words should be used to recognize at least one word from the speech signal.

15. A method comprising:

a processor compiling a markup language grammar to form a binary grammar, the markup language grammar comprising:

a grammar structure delimited with rule tags that conform to a markup language, the grammar structure representing at least one word to be recognized from the speech signal by the speech recognition system; and all of the rule tags for the grammar delimited with grammar tags that conform to a markup language;

providing the binary grammar to a speech recognition engine;

providing a speech signal to the speech recognition engine;

a processor using the binary grammar in the speech recognition engine to identify at least one word in the speech signal.

16. The method of claim 15 wherein the rule tags comprise a value for an interpreter attribute to indicate that code is to be invoked when the grammar structure delimited by the rule tags is recognized from a speech signal.

17. The method of claim 16 further comprising a resource identifier delimited within resource tags within the rule tags to identify a resource to be provided to the code associated with the interpreter attribute.

18. The method of claim 15 further comprising script code delimited within script tags between the rule tags, the script code to be interpreted when the grammar structure delimited by the rule tags is recognized from a speech signal.

19. The method of claim 15 further comprising a list of alternative grammar sub-structures delimited with list tags, wherein the list tags comprise a semantic property identifier attribute such that the semantic property identified by the semantic property identifier attribute is set equal to a value when at least one of the grammar sub-structures in the list of alternative grammar sub-structures is recognized from a speech signal.

20. The method of claim 15 further comprising an optional grammar sub-structure delimited as optional such that the grammar structure delimited by the rule tags can be recognized from a speech signal regardless of whether the optional grammar sub-structure is recognized from the speech signal.

* * * * *